(12) United States Patent
Pfendtner et al.

(10) Patent No.: US 6,912,841 B2
(45) Date of Patent: Jul. 5, 2005

(54) DEVICE AND METHOD FOR EXHAUST-GAS TREATMENT

(75) Inventors: Reinhard Pfendtner, Bietigheim-Bissingen (DE); Patrik Hartherz, Ludwigsburg (DE); Igor Orlandini, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/415,360

(22) PCT Filed: Jul. 10, 2002

(86) PCT No.: PCT/DE02/02572

§ 371 (c)(1),
(2), (4) Date: Oct. 1, 2003

(87) PCT Pub. No.: WO03/027452

PCT Pub. Date: Apr. 3, 2003

(65) Prior Publication Data

US 2004/0045279 A1 Mar. 11, 2004

(30) Foreign Application Priority Data

Aug. 31, 2001 (DE) .......................................... 101 42 800

(51) Int. Cl.[7] ................................................. F01N 3/00
(52) U.S. Cl. ............................. 60/275; 60/274; 60/284; 60/286; 422/186.07; 422/186.15; 422/186.16
(58) Field of Search .......................... 60/274, 275, 284, 60/286, 299; 422/186.03, 186.07, 186.08, 186.15, 186.16, 186.3

(56) References Cited

U.S. PATENT DOCUMENTS

| 5,827,407 A | * | 10/1998 | Wang et al. ................. 204/164 |
| 6,012,283 A | * | 1/2000 | Miller et al. ................... 60/274 |
| 6,212,883 B1 | * | 4/2001 | Kang ........................... 60/275 |
| 6,363,716 B1 | * | 4/2002 | Balko et al. ................... 60/286 |
| 6,772,584 B2 | * | 8/2004 | Chun et al. ................... 60/275 |
| 6,775,972 B2 | * | 8/2004 | Twigg et al. ................. 60/275 |

FOREIGN PATENT DOCUMENTS

| DE | 197 50 178 | 5/1999 |
| DE | 1 020 620 | 7/2000 |
| DE | 199 04 068 | 8/2000 |

* cited by examiner

*Primary Examiner*—Binh Q. Tran
(74) *Attorney, Agent, or Firm*—Kenyon & Kenyon

(57) ABSTRACT

A device and a method for treating the exhaust gas of an internal combustion engine are proposed, comprising an ozone reactor for supplying ozone to the exhaust gas at a delivery location (54), an oxidation reactor (20) for the at least partial oxidation of nitrogen oxides and/or hydrocarbons being positioned upstream from the delivery location (54), the oxidation reactor being active independently of the operating state of the internal combustion engine, especially also at the exhaust-gas temperatures prevailing at the start or during the warm-up phase of the internal combustion engine.

13 Claims, 1 Drawing Sheet

DEVICE AND METHOD FOR EXHAUST-GAS TREATMENT

BACKGROUND INFORMATION

The present invention is directed to a device or a method for treating the exhaust gas of an internal combustion engine according to the species defined in the independent claims. A device for exhaust-gas treatment is already known from DE 199 04 068 in which ozone produced by an ozone reactor is introduced into the exhaust system of an internal combustion engine. However, at low temperatures a combustion of diesel soot is not ensured since the oxidation catalyst upstream from the particle filter does not oxidize nitrogen oxides at low temperatures, especially below an exhaust-gas temperature of 250 degrees Celsius. As a result, the ozone delivered by the ozone reactor is reacted away by the nitrogen oxides, so that it is unable to have any effect as an oxidant in the particle filter.

SUMMARY OF THE INVENTION

In contrast, the device and the method according to the present invention have the advantage over the related art that a soot combustion is ensured even at low exhaust-gas temperatures, especially at exhaust-gas temperatures below 250 degrees Celsius, that is, under cold-start conditions. Moreover, providing two separate branches for the oxidation of nitrogen oxides and for the supply of ozone ensures an energetically advantageous procedure, since the energy quantities required for oxidizing the nitrogen oxides are less than those needed for ozone generation and, energy-wise, each path is able to be optimized on its own as a result of the separation.

Especially advantageous is the provision of a downstream particle filter as an exhaust-gas treatment unit whose regeneration is ensured in all operating states of the engine by the combination of an ozone reactor with a plasma reactor as proposed by the present invention.

Further advantages are derived from the additional features named in the dependent claims and the description.

BRIEF DESCRIPTION OF THE DRAWINGS

Exemplary embodiments of the present invention are shown in the drawing and explained in detail in the following description. The single

DESCRIPTION OF THE EXEMPLARY EMBODIMENTS

Figure 1:
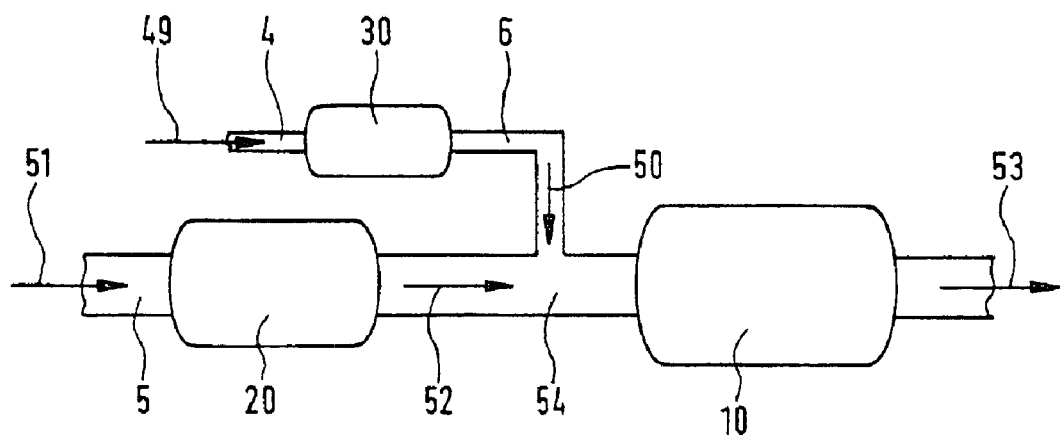
FIG. 1 illustrates a device and a method for exhaust-gas treatment which uses two separate branches for the oxidation of nitride oxides and for the generation of ozone, respectively.

FIG. 1 shows an ozone reactor 30 which is connected on the intake side to an air supply 4 for the infeeding of air 49, and at the output side to an ozone line 6 for the supply of ozone-enriched air 50 to an exhaust line 5 at a delivery location 54. Exhaust-gas line 5 is able to be connected to an internal combustion engine (not shown), especially a diesel combustion engine, to carry away exhaust gas 51. A plasma reactor 20 is situated upstream from delivery location 54 in exhaust-gas line 5. Exhaust gas 52 processed in plasma reactor 20 mixes with ozone-enriched air 50 at delivery location 54 and flows through exhaust-gas treatment unit 10 which is configured as a particle filter. Downstream from the exhaust-gas treatment unit, purified exhaust gas 53 leaves the unit. Both ozone reactor 30 and plasma reactor 20 are reactors for producing a non-thermal plasma, i.e., a gas having relatively cold ions and hot free electrons, that is, high-speed electrons, so that oxygen radicals, in particular, are produced and oxygen molecules and nitrogen monoxides are able to be oxidized into ozone and nitrogen dioxide, respectively. The plasma is produced in a generally known manner in a silent electrical discharge (Corona discharge or dielectric barrier discharge), the gas to be treated flowing between two electrodes, and between which an electrical high-voltage alternating field may be applied. In this connection, a dielectric is applied to at least one electrode and/or the electrode geometry is selected in such a way that field inhomogeneities result which prevent a continuous and sustained spark-discharge, so that the heavy particles, i.e., the ions, are unable to heat up and only the desired silent discharges occur to accelerate the electrons.

Due to the low thermal stability of ozone, this reactive substance is produced by oxidation of the air oxygen in a separate air auxiliary branch (4, 30, 6) whose temperature approximately corresponds to the external temperature of the motor vehicle housing the internal combustion engine. In order to avoid ozone losses due to the oxidation of nitrogen oxides and hydrocarbons contained in diesel exhaust gas 51, plasma reactor 20 is provided between the internal combustion engine and delivery location 54. It oxidizes, the hydrocarbons contained in the exhaust gas at least partially; nitrogen monoxide is oxidized into nitrogen dioxide as well. These oxidation processes both in ozone reactor 30 and in plasma reactor 20 are brought about by the silent electrical discharges which extend along individual filament-like regions between the electrodes in intervals of approximately 50 nanoseconds. In the process, UV light is produced as well, which additionally aids in the oxidation processes. The electrical energy to be fed into the plasma reactor is less than the energy required for ozone reactor 30, so that, in particular, smaller field amplitudes and, thus, voltage amplitudes, suffice in plasma reactor 20 to oxidize the nitrogen monoxides generated per unit of time. By converting the nitrogen oxides into nitrogen dioxide prior to the addition of ozone, the produced ozone is fully retained in the exhaust branch up to the diesel particle filter. This makes it possible to oxidize soot in the diesel particle filter into carbon dioxide with the aid of ozone, especially in continuous operating mode.

In alternative embodiments, the ozone and/or the plasma reactor may also include electrode systems in which both electrodes are covered by a dielectric (two-sided instead of one-sided dielectric barrier electrical discharge). Alternatively, the barrier to the electrical discharge for obtaining silent discharges may also be achieved by appropriate electrode geometries that cause field inhomogeneities, thereby preventing continuous spark discharges. This is assured, for instance, by a cylindrical electrode arrangement in which one of the electrodes is concentrically configured as a rod in a cylinder through which gas flows and which constitutes the second electrode. Alternatively, instead of an electrical a.c. voltage in the kHz-range, a pulsed direct voltage may be applied as well. In this case, however, a pulse-pause ratio has to be provided whose minimum value is defined by the flow velocity of the exhaust gas and whose maximum value is predefined by the duration required for evenly dispersing again the electrons present on an employed dielectric. In an additional alternative embodiments a system may be provided as an ozone and/or as a plasma reactor which has an UV lamp as the essential element for initiating oxidation processes.

What is claimed is:

1. A device for treating the exhaust gas of an internal combustion engine, comprising:

an ozone reactor for delivering ozone to the exhaust gas at a delivery location; and an oxidation reactor positioned upstream from the delivery location for at least partial oxidation of at least one of nitrogen oxides and hydrocarbons, the oxidation reactor being active independently of an operating state of the internal combustion engine;

wherein the oxidation reactor is a plasma reactor.

2. The device as recited in claim 1, wherein the oxidation reactor is active at exhaust-gas temperatures prevailing at one of a start and during a warm-up phase of the internal combustion engine.

3. The device as recited in claim 1, wherein the plasma reactor is a reactor which produces a non-thermal plasma.

4. The device as recited in claim 3, wherein the non-thermal plasma is produced by at least one of an electrical discharge and a UV lamp.

5. The device as recited in claim 4, wherein the electrical discharge is a silent electrical discharge.

6. The device as recited in claim 5, wherein the silent electrical discharge is a dielectrical barrier electrical discharge.

7. The device as recited in claim 1, wherein the ozone reactor is formed by an additional plasma reactor.

8. The device as recited in claim 7, wherein the additional plasma reactor is a reactor for producing a non-thermal plasma.

9. The device as recited in claim 1, further comprising:

an exhaust-gas treatment unit situated downstream from the delivery location in a direction of the exhaust-gas flow.

10. The device as recited in claim 9, wherein the exhaust-gas treatment unit is a particle filter.

11. The device as recited in claim 10, wherein the particle filter is catalytically coated.

12. A method for treating the exhaust gas of an internal combustion engine in which ozone is added to the exhaust gas to be purified, comprising:

prior to the addition of ozone, at least partially oxidizing, post-engine, at least one of nitrogen oxides and unburned hydrocarbons contained in the exhaust gas, the oxidizing being carried out by a plasma reactor independently of an operating state of the internal combustion engine.

13. The method as recited in claim 12, wherein the oxidizing is carried out at exhaust-gas temperatures prevailing at at least one of a start and during a warm-up phase of the internal combustion engine.

* * * * *

UNITED STATES PATENT AND TRADEMARK OFFICE
CERTIFICATE OF CORRECTION

PATENT NO. : 6,912,841 B2
APPLICATION NO. : 10/415360
DATED : October 1, 2003
INVENTOR(S) : Reinhard Pfendtner et al.

It is certified that error appears in the above-identified patent and that said Letters Patent is hereby corrected as shown below:

Title Page
On the face of the patent, # (57) Abstract, line 4, change "delivery location (54)," to --delivery location,--

On the face of the patent, # (57) Abstract, line 4, change "oxidation reactor (20)" to --oxidation reactor--

On the face of the patent, # (57) Abstract, lines 6-7, change "delivery location (54)," to --delivery location.--

Column 1, line 5, change "BACKGROUND INFORMATION" to --FIELD OF THE INVENTION--

Column 1, lines 8-9, change "engine according to the species defined in the independent claims." to --engine.--

Column 1, line 9, insert --BACKGROUND INFORMATION--

Column 1, line 10, change "is already known from" to --is described in German Patent Application No.--

Column 1, line 21, change "SUMMARY OF THE INVENTION" to --SUMMARY--

Column 1, line 23, change "In contrast, the device and the method" to --An example device and method--

Column 1, line 24, change "have the advantage" to --may have an advantage--

Column 1, line 24, change "related art that" to --related art in that--

Column 1, lines 40-41, delete "Further advantages . . . and the description."

Column 1, line 43, change " . . . OF THE DRAWINGS" to -- . . . OF THE DRAWING--

Column 1, line 47, begin new paragraph and change "The single FIG. 1 illustrates a device" to --FIG. 1 illustrates an example device--

UNITED STATES PATENT AND TRADEMARK OFFICE
CERTIFICATE OF CORRECTION

PATENT NO.        : 6,912,841 B2
APPLICATION NO.   : 10/415360
DATED             : October 1, 2003
INVENTOR(S)       : Reinhard Pfendtner et al.

It is certified that error appears in the above-identified patent and that said Letters Patent is hereby corrected as shown below:

Column 1, lines 52-53, change "DESCRIPTION OF THE EXEMPLARY EMBODIMENTS" to "DETAILED DESCRIPTION"

Column 2, line 6, change "a generally known" to --a generally conventional--

Column 2, line 25, change "It oxidizes," to --It oxidizes--

Column 2, line 54, change "This is" to --This may be--

Column 2, line 66, delete "essential"

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

PATENT NO.       : 6,912,841 B2
APPLICATION NO. : 10/415360
DATED            : July 5, 2005
INVENTOR(S)      : Reinhard Pfendtner et al.

It is certified that error appears in the above-identified patent and that said Letters Patent is hereby corrected as shown below:

Title Page
On the face of the patent, # (57) Abstract, line 4, change "delivery location (54)," to --delivery location,--

On the face of the patent, # (57) Abstract, line 4, change "oxidation reactor (20)" to --oxidation reactor--

On the face of the patent, # (57) Abstract, lines 6-7, change "delivery location (54)," to --delivery location.--

Column 1, line 5, change "BACKGROUND INFORMATION" to --FIELD OF THE INVENTION--

Column 1, lines 8-9, change "engine according to the species defined in the independent claims." to --engine.--

Column 1, line 9, insert --BACKGROUND INFORMATION--

Column 1, line 10, change "is already known from" to --is described in German Patent Application No.--

Column 1, line 21, change "SUMMARY OF THE INVENTION" to --SUMMARY--

Column 1, line 23, change "In contrast, the device and the method" to --An example device and method--

Column 1, line 24, change "have the advantage" to --may have an advantage--

Column 1, line 24, change "related art that" to --related art in that--

Column 1, lines 40-41, delete "Further advantages . . . and the description."

Column 1, line 43, change " . . . OF THE DRAWINGS" to -- . . . OF THE DRAWING--

Column 1, line 47, begin new paragraph and change "The single FIG. 1 illustrates a device" to --FIG. 1 illustrates an example device--

UNITED STATES PATENT AND TRADEMARK OFFICE
CERTIFICATE OF CORRECTION

PATENT NO. : 6,912,841 B2
APPLICATION NO. : 10/415360
DATED : July 5, 2005
INVENTOR(S) : Reinhard Pfendtner et al.

It is certified that error appears in the above-identified patent and that said Letters Patent is hereby corrected as shown below:

Column 1, lines 52-53, change "DESCRIPTION OF THE EXEMPLARY EMBODIMENTS" to "DETAILED DESCRIPTION"

Column 2, line 6, change "a generally known" to --a generally conventional--

Column 2, line 25, change "It oxidizes," to --It oxidizes--

Column 2, line 54, change "This is" to --This may be--

Column 2, line 66, delete "essential"

This certificate supersedes Certificate of Correction issued August 29, 2006.

Signed and Sealed this

Seventh Day of November, 2006

JON W. DUDAS
*Director of the United States Patent and Trademark Office*